Figure 1:
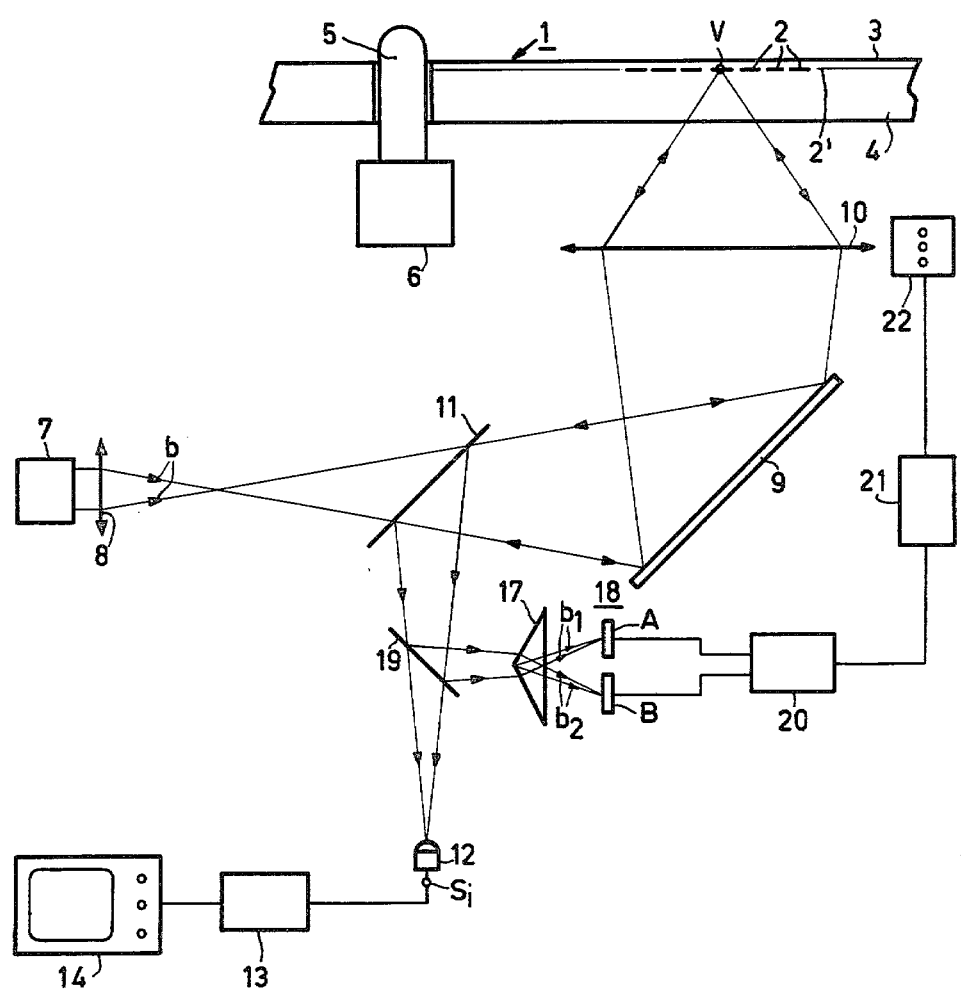

United States Patent [19]

Bouwhuis et al.

[11] 4,233,502
[45] Nov. 11, 1980

[54] OPTO-ELECTRONIC FOCUSSING ERROR DETECTION ARRANGEMENT

[75] Inventors: Gijsbertus Bouwhuis; Teunis J. Hazerdonk, both of Eindhoven, Netherlands

[73] Assignee: U.S. Philips Corporation, New York, N.Y.

[21] Appl. No.: 925,432

[22] Filed: Jul. 17, 1978

[30] Foreign Application Priority Data

Apr. 14, 1978 [NL] Netherlands ............... 7803969

[51] Int. Cl.² ............................................. G01D 1/36
[52] U.S. Cl. ............................. 250/204; 179/100.1 G
[58] Field of Search ............... 250/201, 204, 570, 208, 250/209; 354/25; 356/1, 4; 358/128; 179/100.3 V, 100.3 G

[56] References Cited

U.S. PATENT DOCUMENTS

| 4,005,260 | 1/1977 | Janssen | 358/128 |
| 4,006,293 | 2/1977 | Bouwhuis et al. | 179/100.3 V |
| 4,097,730 | 6/1978 | Korpel | 250/201 |

OTHER PUBLICATIONS

"Resistive-Insulated-Gate Arrays and Their Applications: An Exploratory Study", M. V. Whelan et al., Phillips Res. Repts. 30, 436–482, 1975.

Primary Examiner—David C. Nelms
Attorney, Agent, or Firm—Thomas A. Briody; William J. Streeter; Simon L. Cohen

[57] ABSTRACT

An opto-electronic focussing-error detection arrangement is described for the detection of a deviation between a radiation reflecting surface and the plane of focussing of an objective system. In the path of the beam which is reflected by the surface a beam-splitting element is disposed and behind said element two radiation-sensitive detectors are arranged which are each associated with one of the subbeams formed by the beam-splitting element. The detectors are grating-shaped detectors and are effectively divided into two detector sections by selection devices, the bounding line being adjustable. A focussing error signal is obtained which is highly independent of a positional error of the radiation-sensitive detection system relative to the beam axis.

2 Claims, 10 Drawing Figures

OPTO-ELECTRONIC FOCUSSING ERROR DETECTION ARRANGEMENT

The invention relates to an opto-electronic focusing error detection arrangement for detecting, in an optical imaging system, a deviation between a radiation-reflecting surface and a focussing plane of an objective system, in particular for use in an apparatus for reading a record carrier with an optical radiation-reflecting information structure and an apparatus for optically writing information in a record carrier, which focussing error detection arrangement comprises a beam-splitting element disposed in the path of a radiation beam which has been reflected by said surface and, disposed behind the beam-splitting element, a radiation-sensitive detection system which comprises two detectors each associated with one of the subbeams formed by the beam-splitting element, the outputs of the detectors being connected to the inputs of an electronic circuit in which a focussing-error signal is derived from the detector signals.

Such a focussing error detection arrangement, which is adapted for use in an apparatus for testing objectives, is described in German Auslegeschrift No. 1,299,134.

The detectors of the radiation-sensitive detection system are divided into two subdetectors. In the event of a focussing error the radiation spots formed on the detectors move in opposite directions, so that the two outer subdetectors receive a different radiation intensity than the two inner subdetectors. A focussing-error signal is obtained by comparing the output sum signal of the outer subdetectors with the output sum signal of the inner subdetectors.

For optical systems with which very small information details have to be imaged, and which operate with a large numerical aperture, the depth of focus is small. For this type of imaging systems, which are for example used in microscopes or in equipment for reading an optical information structure with very small details or in equipment for writing information in a record carrier, it is of importance that a deviation between the actual and the desired plane of focussing can be detected, so as to enable the focussing to be corrected in response thereto.

As is now presumably common knowledge, a record carrier which is readable with the aid of optical radiation can be used as a medium for the transmission of information, such as for example a television program or an audio programme. The information structure then comprises trackwise arranged areas which alternate with intermediate areas, the areas having a different influence on the read beam than the intermediate areas. The information is for example contained in the spatial frequency of the areas, and as the case may be in the lengths of the areas.

For a sufficiently long playing time of such a record carrier, the areas and the intermediate areas should have very small dimensions, for example a width of 0.5 $\mu$m, and an average length of 0.5 $\mu$m. For a period transverse to the tracks of 1.7 $\mu$m a round disc-shaped record carrier can then store a television program of approximately 30 minutes within an annular area having an inner radius of approximately 6.5 cm and an outer radius of approximately 14 cm. In order to enable the minute information details to be read separately, the information structure should be scanned with a small radiation spot, for example with a diameter of the order of 1 $\mu$m. If the read beam is a laser beam with a Gaussian intensity distribution, the diameter is to be understood to mean the distance between the points where the intensity is $e^{-2}$ times the intensity in the center of the radiation spot. In order to enable such a small radiation spot to be formed, the wavelength of the read beam ($\lambda$) and the numerical aperture (N.A.) of the read objective should be selected appropriately. This is because the diameter of the read spot is proportional to $\lambda$/N.A. Generally selected practical values are $\lambda = 0.6328$ $\mu$m and N.A. $= 0.45$.

An objective system with such a numerical apertures has a small depth of focus, for example of the order of 1 $\mu$m. In order to enable the information structure to be read correctly the objective system should always remain sharply focussed on the surface of the information structure. As in the read apparatus the distance between the objective system and the surface of the information structure may vary for various reasons, for example because the record carrier is not perfectly plane or as a result of vibrations of read-system elements, steps should be taken so as to enable said variations to be detected and the focussing to be corrected in response thereto.

When the minute information details are written in a record carrier the write beam should also remain focussed to a small radiation spot on the layer to be written in, so that the said steps should then also be taken.

For the detection of focussing errors the focussing-error detection arrangement mentioned in the preamble could be used. However, in this arrangement the position of the radiation-sensitive detection system relative to the axis of the radiation beam is very critical. A small displacement of the detection system transverse to the radiation beam gives rise to a variation in the radiation distribution over the detectors of the detection system, which variation is interpreted as a focussing error.

It is the object of the present invention to provide a focussing error detection arrangement, which is in particular adapted for use in a read apparatus or a write apparatus, in which arrangement the influence of a positional error of the detection system on the focussing error signal is substantially reduced. The arrangement in accordance with the invention is therefore characterized in that the detectors are disposed in a plane in which the reflected beam is focussed if the said deviation is zero, that each detector takes the form of a grating and comprises at least three radiation-sensitive strips, that said electronic circuit moreover derives a positional-error signal from the detector signals, and that each detector is connected to a separate selection device which effectively divides the detector into two detector sections, the bounding line of the detector sections being adjustable depending on the positional error signal which is applied to a control input of the selection circuit.

Use is made of the fact that in the case of a displacement of the detection system relative to the axis of the radiation beam the radiation spots move over the detectors in the same direction. By determining the difference of the output signals of the detector sections for both detectors and adding the difference signals to each other, a positional error signal is obtained, i.e. a signal which provides an indication of an error in the position of the detection system relative to the axis of the radiation beam, which positional error signal is independent of a focussing error. By means of the positional error signal the bounding line of each of the detectors can be adjusted electronically, so that these bounding lines in fact follow the radiation spots. A variation in the radiation distribution as a result of a focussing error is then not followed, because a focussing error causes the two radiation spots to move in opposite directions.

A preferred embodiment of an arrangement in accordance with the invention, in which the selection devices are constituted by electronic selection circuits, is characterized in that each of the selection circuits is constituted by two rows of field-effect transistors with a common insulated gate electrode of a resistive material, that of each row the source region of each transistor is connected to a strip of the detector, and the drain regions of all transistors are interconnected, and that the voltage gradients across the two common gate electrodes of a selection circuit have an opposite sense, the gate electrodes being connected to that output of the said electronic circuit at which the positional error signal appears.

Figure 2A:
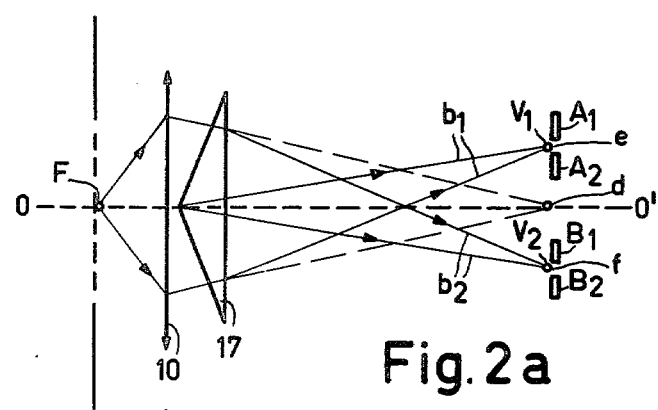
Figure 2B:
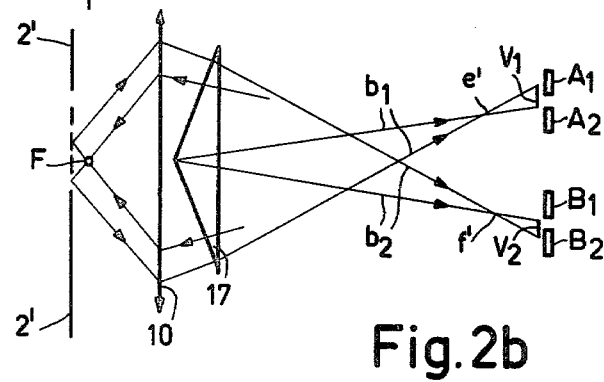
Figure 3:
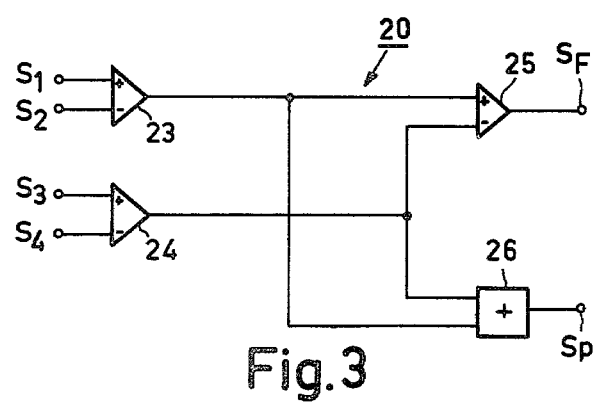
Figure 4:
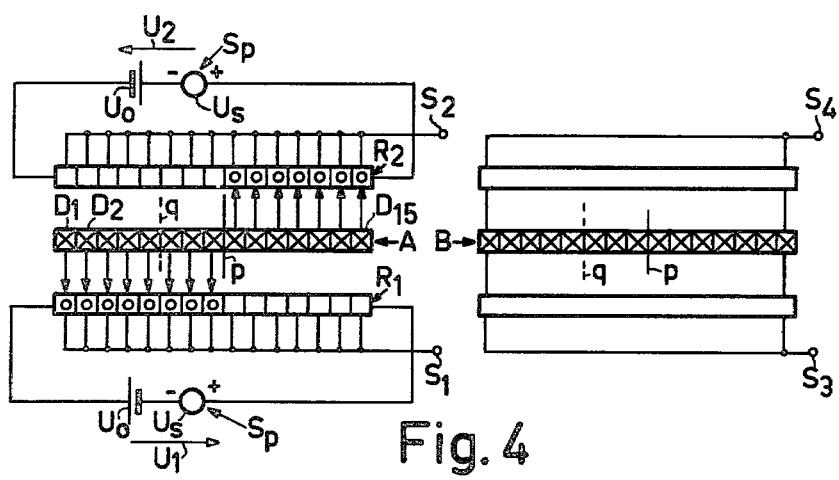
Figure 5:
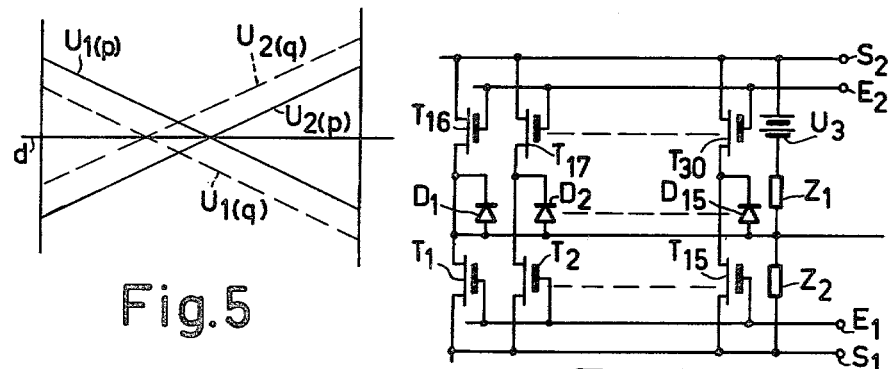
Figure 6:
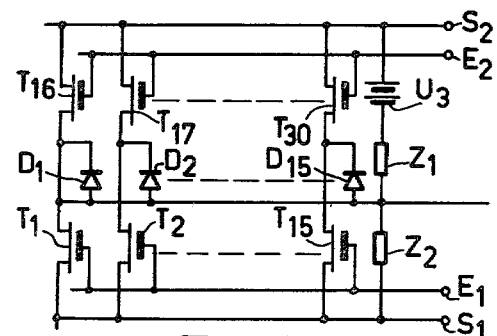
Figure 7:
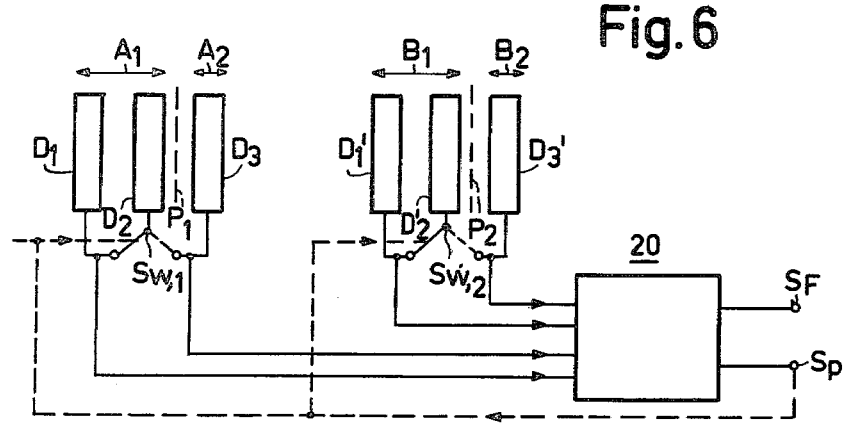
Figure 8:
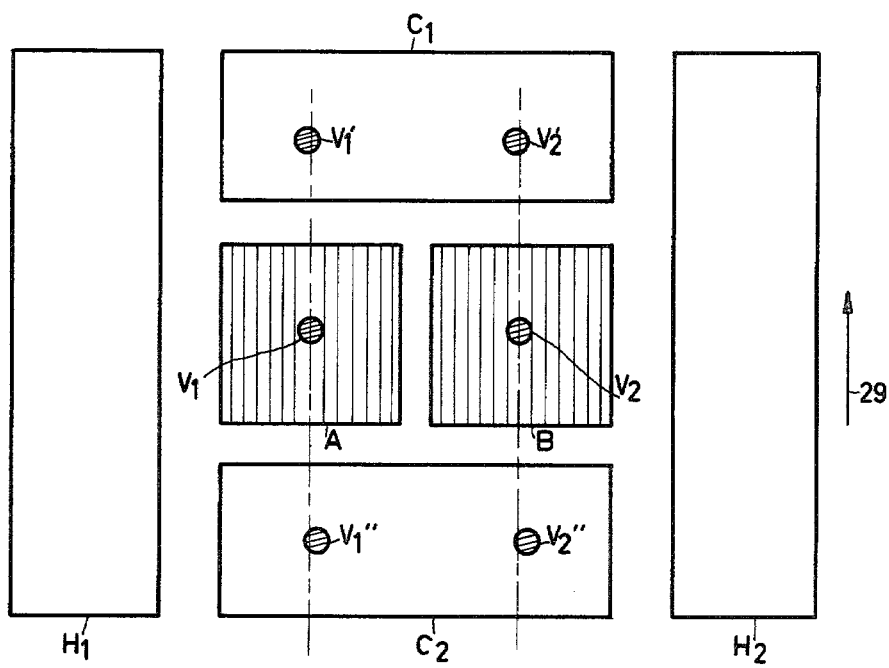
Figure 9:
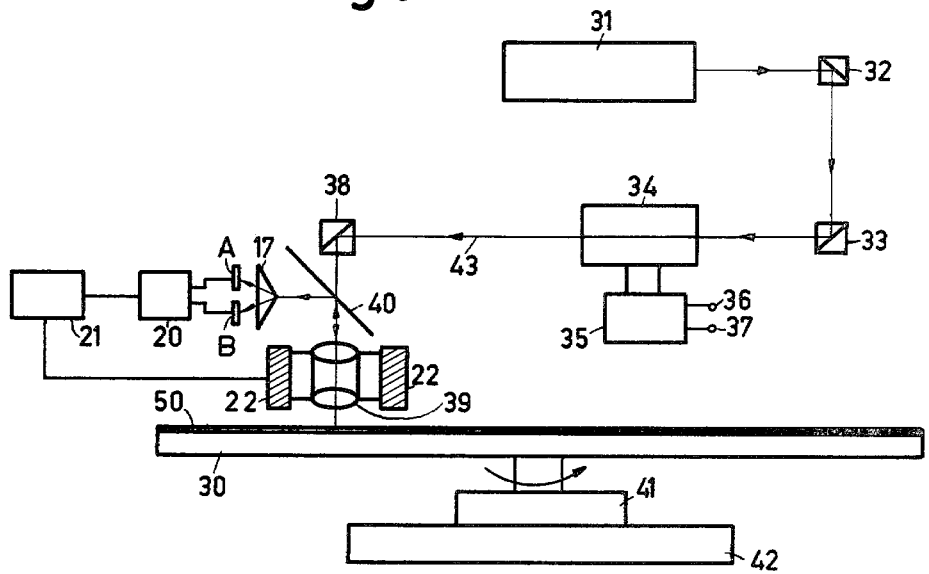

The invention will now be described in more detail with reference to the drawing. In the drawing:

FIG. 1 schematically shows an example of a read apparatus using the arrangement in accordance with the invention FIGS. 2a and 2b represent the principle of the focussing error detection arrangement used in said apparatus, FIG. 3 shows an example of an electronic circuit for deriving a focussing error signal and a positional error signal from the detector signals, FIG. 4 shows a preferred variant of an electronic selection circuit for the grating-shaped detectors, FIG. 5 represents the gradients of the control voltages for said selection circuit, FIG. 6 shows said selection circuit in detail, FIG. 7 shows a second variant of a radiation-sensitive detection system and the associated selection devices, FIG. 8 shows a radiation-sensitive detection system with grating-shaped detectors for the focussing error detection, and further detectors for detecting a positional error of a read spot relative to the middle of a track to be read, and FIG. 9 shows an example of a write apparatus using a focussing error detection arrangement in accordance with the invention.

In these Figures corresponding elements always bear the same reference numerals.

FIG. 1 shows a round disc-shaped record carrier 1 in radial cross-section. The tracks 2 of the reflecting information surface 2', which tracks comprise areas, not shown, are perpendicular to the plane of drawing. By way of example it has been assumed that the information surface 2' is located at the top of the record carrier and that reading is effected through the substrate 4 of the record carrier, for example a plastic. The information surface 2' may be covered with a protective layer 3. The record carrier can be rotated by a spindle 5 which is driven by a rotary motor 6.

A radiation source 7, for example a helium-neon laser or a semiconductor diode laser, produces a read beam b. This beam is reflected by a mirror 9 to an objective system 10, which is schematically represented by a single lens. The path of the beam b includes an auxiliary lens 8, which ensures that the pupil of the objective system is filled in an optimum manner. A read spot V of minimal dimensions is then formed on the information structure.

The read beam is reflected by the information structure and, when the record carrier rotates, it is modulated in accordance with the sequence of the areas in a read track being read. By radially moving the read spot and the record carrier relative to each other by known means, not shown, the entire information surface can be scanned.

The modulated read beam passes again through the objective system 10 and is reflected by the mirror 9. In the radiation path means have been included for separating the modulated and the unmodulated read beam. These means may for example comprise a polarization-sensitive splitter prism and a $\lambda/4$ plate, $\lambda$ being the wavelength of the read beam. For the sake of simplicity the said means are represented by a semitransparent mirror 11 in FIG. 1. This mirror reflects the modulated read beam to a radiation-sensitive information detector 12. The output signal $S_i$ of this detector is modulated in accordance with the information being read and can be applied to a demodulator 13 in which the signal is processed and adapted so as to be reproduced by means of for example a television set 14.

In order to enable focussing errors to be detected a beam-splitting element 17, for example an optical wedge, is included in the path of the reflected beam and behind this wedge a radiation-sensitive detection system 18 is included, which comprises two detectors A and B. The optical wedge is disposed at a location where the reflected beam is still fairly wide, i.e. at some distance from the image plane of the objective system 10, in which image plane the two detectors A and B are disposed. The width of the beam at the location of the wedge should be large relative to the positional tolerance, transverse to the beam axis, of the wedge and relative to inaccuracies in the edge of the wedge. In the ideal case the edge will be straight, but in practice the edge may be jagged. The wedge may be disposed in a plane in which an image of the exit pupil of the objective system is formed by an auxiliary lens, not shown. The path of the reflected read beam furthermore includes a semitransparent mirror 19. Thus, most part of the modulated read beam is transmitted to the information detector 12, and a small part of the beam is reflected to the detectors A and B.

The optical wedge splits the beam into two subbeams $b_1$ and $b_2$, of which the beam $b_1$ cooperates with the detector A and the subbeam $b_2$ with the detector B. The detectors A and B are divided into two detector sections $A_1$, $A_2$ and $B_1$, $B_2$ as is shown in FIGS. 2a and 2b. These Figures serve to illustrate the principle of the focussing error detection arrangement, and therefore only those elements are shown which are essential for this detection.

In FIG. 2a the situation is represented in which the read beam is exactly focussed on the information surface 2'. In the absence of the wedge 17 the reflected beam would be focussed in point d, as is indicated by the dashed lines. The wedge forms the subbeams $b_1$ and $b_2$, which are focussed to radiation spots $V_1$ and $V_2$ in the points e and f. The wedge 17 is arranged at such a distance from the detectors A and B that in the case of a correct focussing point e and point f are situated exactly on the bounding line of the detector sections $A_1$, $A_2$ and $B_1$, $B_2$ respectively. The detector sections $A_1$ and $A_2$ then receive the same amounts of radiation and so do the detector sections $B_1$ and $B_2$.

If the focus F of the read beam were situated to the right of the information surface 2', as is indicated in FIG. 2b, the focus of the subbeam $b_1$ and of the subbeam $b_2$ would be situated in the point e' and the point f' respectively. The respective detector section $A_1$ or $B_2$ would then receive more radiation than the detector section $A_2$ or $B_1$ respectively. If the focus of the read beam were situated to the left of the information surface $2'$, the reverse would happen, and the respective detector section $A_2$ or $B_1$ would receive more radiation than the detector section $A_1$ or $B_2$ respectively.

When the signals from the detector sections $A_1$, $A_2$ $B_1$ and $B_2$ are respectively represented by $S_1$, $S_2$, $S_3$ and $S_4$, the focussing error signal $S_F$ is given by:

$$S_F = (S_1 + S_4) - (S_2 + S_3)$$

The signals from the detector sections, as is indicated in FIG. 1, are applied to an electronic circuit 20, in which the signal $S_F$ is formed. This signal is applied to a control circuit 21 for an actuator 22, by means of which the objective system can be moved in such a way that the signal $S_F$ becomes zero. The actuator 22 may for example be an electromechanical actuator, such as a moving-coil, as is schematically shown in FIG. 1.

FIG. 3 shows an example of the circuit 20. The signals $S_1$ and $S_2$ are applied to a differential amplifier 23 and the signals $S_3$ and $S_4$ to a differential amplifier 24. The outputs of the amplifiers 23 and 24 are connected to the inputs of a differential amplifier 25. At the output of the last-mentioned amplifier the signal $(S_1 - S_2) - (S_3 - S_4)$, i.e. the signal $S_F$, is thus obtained.

With the aid of the detector sections $A_1$, $A_2$, $B_1$ and $B_2$ it is also possible to derive a positional error signal $S_p$, which provides an indication about a deviation of the centre of the detection system A, B relative to the beam axis, which axis is designated $OO'$ in FIG. 2a. Such a deviation may occur as a result of for example a tilted position of the laser source, a tilted position of a mirror in the optical system, etc.

If no means are provided for detecting and thus correcting positional errors, very stringent requirements should be imposed on the position of the detectors A and B relative to the read-beam axis during assembly of the read apparatus. If these stringent requirements would have been met, said position could still change in the course of time as a result of after-effects, such as contraction or expansion, of the construction materials.

In the case of a relative movement of the beam and the detection system the radiation spots $V_1$ and $V_2$ move in the same direction relative to the detectors A and B. If in FIGS. 2a and 2b the beam would move upwards, the radiation spots $V_1$ and $V_2$ would both move upwards. Then, disregarding a focussing error, the respective detector section $A_1$ or $B_1$ would receive more radiation than the detector section $A_2$ or $B_2$ respectively. In the case of a downward movement of the beam, the reverse happens. The positional error signal is given by: $S_p = (S_1 - S_2) + (S_3 - S_4)$. As is shown in FIG. 3, this signal can be obtained by adding the output signals of the differential amplifiers 23 and 24 to each other in the summing device 26. The signal $S_p$ enables the position of the bounding lines of the detector sections $A_1$ and $A_2$ and of the detector sections $B_1$ and $B_2$ relative to the optical axis to be corrected.

It could be considered to move the detection system 18 mechanically using the signal $S_p$. However, this demands additional electromechanical provisions. It is far more attractive, as is proposed by the present invention, to adjust the bounding line between the detector sections electronically.

The detector sections $A_1$, $A_2$ and $B_1$, $B_2$, respectively which are represented by separate detectors in FIGS. 2a and 2b, are in reality parts of one detector in the form of a grating. FIG. 4 shows these grating-shaped detectors A and B. The individual detectors, for example photo diodes, of the rows A and B are represented by blocks in which a cross is drawn. It is assumed that for the row A the incident radiation spot $V_1$ is symmetrical relative to the line p. The detector row A is electronically divided, in such a way that the part of the row to the left of the line p constitutes a detector section $A_1$ and the part to the right of the line p a detector section $A_2$ (compare FIG. 2a).

Electronic division is preferably effected by means of an electronic selection circuit. Such a selection circuit, for other applications, is described in "Philips Research Reports" 30 (1975), pages 436–482, and will only be described in so far as this is necessary for a correct understanding of the invention. The selection circuit is constituted by two rows $R_1$ and $R_2$ of field effect transistors with an insulated control (or gate) electrode. The transistors of a row have a common gate electrode. The gate electrode is of a resistive material. Such a row of transistors is known by the name of RIGFET: resistive insulated-gate field-effect transistor.

Between the ends of the control electrodes a certain voltage is applied, so that a specific voltage gradient is produced across these electrodes. The magnitude of the voltage determines which transistors of a row are conductive and which are cut-off. Thus, it is also determined of which detectors of the row the output signals are transferred or not transferred by the transistors, and thus which detectors belong to the section $A_1$ and which detectors to the section $A_2$. In FIG. 4 the non-conducting transistors are represented by a blank square block, and the conducting transistors by a block with a circle.

FIG. 6 shows the selection circuit for a detector row in more detail. The transistors of a row are designated by $T_1$ to $T_{15}$ and those of the other row by $T_{16}$ to $T_{30}$, and the photo-diodes by $D_1$ to $D_{15}$. $E_1$ and $E_2$ are the common control electrodes for the rows $R_1$ and $R_2$. The voltage source $U_3$ furnishes the supply voltage for the transistors. The resistors $Z_1$ and $Z_2$ are load resistors. The currents supplied by the photo diodes and transferred by the transistors add to each other and result in the detector signals $S_1$ and $S_2$. The second selector row B provides the signals $S_3$ and $S_4$ in a similar way.

If the detectors of a row consist of photo diodes, the selection circuits may be integrated with the detectors in such a way that the drain regions of the transistors are integral with the strips of the detector row. As the output currents of a transistor row are added, the drain regions of the transistors of one row can be integrated.

The voltages $U_1$ and $U_2$ across the common control electrodes of the transistor rows $R_1$ and $R_2$ have been selected so that the non-conducting part of the row $R_1$ is equal to the conducting part of the row $R_2$. The voltages $U_1$ and $U_2$ consist of a basic voltage $U_o$, with opposite signs for $U_1$ and $U_2$, with superimposed thereon a variable voltage $U_s$ which is determined by the positional error signal $S_p$ which is obtained from the circuit in accordance with FIG. 3. The voltage $U_s$ has a different sign for $U_1$ than for $U_2$.

FIG. 5 represents the variation of the voltages $U_1$ and $U_2$ across the associated common gate electrode of the rows $R_1$ and $R_2$. $U_{1(p)}$ and $U_{2(p)}$ refer to the gradients of the voltages in the case that the bounding line of the row of photodiodes has the position p. The level d is the threshold voltage at which the transistors are turned on.

If as a result of a positional error of the detection system the radiation spots $V_1$ and $V_2$ would both move to the left relative to their detector row A and B, the signal $S_p$ would increase. This means that $U_2$ increases and $U_1$ decreases, as is indicated by the dashed lines in FIG. 5. As a result of the higher value of $U_2$ more transistors of the row $R_2$ are turned on, while as a result of the smaller value of $U_1$ more transistors of the row $R_1$ are turned off. The bounding line is then situated near q (compare FIG. 4). In a similar way the bounding line of the detector section of the row B is also shifted. Thus, the bounding lines follow the movements of the radiation spots if these movements are the result of positional errors of the detection system relative to the read beam axis. The radiation distribution over the detector sections as a result of a focussing error is not influenced by the movement of the bounding lines, because the signal $S_p$ is independent of a focussing error.

For the sake of simplicity it has been assumed that in FIG. 4 the detectors of a row are as long as they are wide. In reality the detectors are radiation-sensitive strips whose length, i.e. the dimension transverse to the direction of a row in FIG. 4 and the dimension perpendicular to the plane of drawing in FIG. 2a, is substantially greater than the width. The sensitivity of the focussing error detection system to positional errors in the longitudinal directions of the strips is then substantially smaller than in the direction of the row of detectors. Many of the previously proposed focussing error detection systems, for example the system which has been described in United States Pat. No. 4,023,033 are just as sensitive to positional errors in a first direction as to a positional error in a second direction transverse to the first direction.

The signals $S_1$, $S_2$, $S_3$ and $S_4$ from the detector sections $A_1$, $A_2$, $B_1$ and $B_2$ may also be processed into a signal $$S_w = (S_1 - S_2) - (S_3 + S_4)$$

This signal, which provides an indication about the position of the edge of the wedge transverse to the beam axis, may be employed for correctly adjusting the wedge during assembly of the apparatus.

In an embodiment of an arrangement in accordance with the invention, in which the objective system had a numerical aperture of 0.45, the detectors A and B each comprised fifteen radiation-sensitive strips with a width of 20 μm and a length of approximately 350 μm. In this arrangement deviations of the detection-system centre relative to the axis of the read beam of the order of 250 μm are still permissible, while in the previously proposed focussing error detection arrangements only deviations of the order of 25 μm were permissible.

With the detection system shown in FIG. 4, which comprises 15 radiation-sensitive strips per detector, the bounding line of the detector sections can be adjusted very accurately. In cases in which such an accurate adjustment is not necessary, it suffices to use a smaller number of radiation-sensitive strips per detector. The detectors then have a coarser grating structure. Instead of the selection circuits in accordance with FIG. 4, it is then possible to use simpler selection devices, such as switches.

FIG. 7 shows a detection system with a small number, namely three, of radiation-sensitive strips $D_1$, $D_2$, $D_3$ and $D'_1$, $D'_2$, $D'_3$ per detector. The output of the innermost detector $D_2$ or $D'_2$ is connected to the master terminal of a switch $Sw_1$ and $Sw_2$ respectively. In the shown position of the switch the output signal of the detector $D_2$ or $D'_2$ is added to the output signal of the detector $D_1$ or $D'_1$ respectively. The detectors $D_1$ and $D_2$ and the detectors $D'_1$ and $D'_2$ together constitute the detector section $A_1$ and the detector section $B_1$ respectively, whilst the detector $D_3$ and $D'_3$ constitute the detector section $A_2$ and the detector section $B_2$ respectively. The bounding line $P_1$ and $P_2$ of the detector sections is then situated between the detectors $D_2$ and $D_3$ and between the detectors $D'_2$ and $D'_3$ respectively. The output signals of the detector sections $A_1$, $A_2$, $B_1$ and $B_2$ are again applied to the electronic circuit 20, in which a focussing error signal $S_F$ and a positional error signal $S_p$ are derived. The position of the switches can be controlled with the signal $S_p$. Should the radiation spots $V_1$ and $V_2$ move to the left relative to the detectors, the switches $S_1$ and $S_2$ are changed over, so that the output signal of the detector $D_2$ or the detector $D'_2$ is added to the output signal of the detector $D_3$ or the detector $D'_3$ respectively.

In the arrangement in accordance with FIG. 1 a separate detector 12 is used for reading the information. The detectors A and B of the focussing-error detection arrangement may also be employed for reading the information. The detector 12 and the mirror 19 may then be dispensed with. The wedge 17 can then be disposed in the radiation path at the location of the mirror 19. The information signal, which now equals $S_1 + S_2 + S_3 + S_4$, is again applied to the demodulator 13.

The beam which is reflected by the information surface can also be split into two subbeams $b_1$ and $b_2$ with elements other than an optical wedge. As an example, a fully reflecting mirror may be disposed in one beam half of the reflected beam, so that one beam half ($b_1$) continues in the direction which would be followed by the undivided beam, whilst the other beam half ($b_2$) is reflected in an other direction. A grating-shaped detector A or B is then again disposed in the path of the subbeam $b_1$ or $b_2$ respectively in a position which corresponds to the ideal focus of the undivided beam.

When a record carrier with an optical information structure is read care must be taken that the read spot V always remains positioned in the middle of a track to be read. In order to enable deviations in the radial direction of the read spot relative to a track to be detected, it is possible, as is described in the U.S. Pat. No. 3,876,842 issued Apr. 8, 1975, to project two additional (servo) radiation spots on the information surface in addition to the read spot. The radiation spots are positioned so that if the centre of the read spot coincides with the middle of a track, the centres of the servo spots are situated on the two edges of the track. Each servo spot is associated with a separate detector. By comparing the output signals of the servo detectors with each other the magnitude and the direction of a deviation in the radial position of the read spot relative to the track can be determined. The servo spots can be formed by including a grating in the radiation path of the read beam. This grating splits the beam into a zero-order (read) beam and two first-order (servo) beams. A detection system which in addition to the detector for the focussing-error detection also comprises detectors for the radial position of the radiation spot may be as shown in FIG. 8.

In this Figure the direction of the information tracks is indicated by the arrow 29. A and B are the grating-shaped focussing-error detectors on which the radiation spots $V_1$ and $V_2$ are projected. Each of these spots is locked to two servo spots $V'_1$, $V'''_1$ and $V'_2$, $V''_2$ respectively. The servo spots $V'_1$ and $V'''_1$ are projected on an undivided detector $C_1$ and the servo spots $V'''_1$ and $V''_2$ on the undivided detector $C_2$. From the signals of the grating-shaped detectors A and B a focussing-error signal, a positional error signal, and an information signal can be derived in the manner described hereinbefore. By subtracting the output signals of the detectors $C_1$ and $C_2$ from each other, a radial error signal is obtained.

There may also be provided two detectors $H_1$ and $H_2$. In the case of small focussing errors these detectors are not exposed. In the case of larger focussing errors, which can no longer be detected by the detectors A and B, the radiation spots $V_1$ and $V_2$ are blown up and the detectors A and B also receive radiation. By comparing the output signals of these detectors a coarse focussing error signal is obtained.

The detection system of FIG. 8 is particularly suitable for the construction of an integrated detector with separate detector sections.

It is obvious that the invention may also be employed for reading a record carrier in the form of a tape instead of a disc-shaped record carrier.

The focussing error detection arrangement in accordance with the invention may also be used for writing information on a record carrier body.

FIG. 9 shows an example of such an arrangement, which apart from the elements for determining the focussing errors, has been proposed previously in the previous Pat. No. 3,894,179, issued July 8, 1975.

The arrangement comprises a radiation source 31, for example a laser source, which produces a radiation beam 43 of sufficient energy. Via the prisms 32 and 38 this beam is aimed at the record carrier body (30) to be written in and is then concentrated to a small radiation spot by an objective lens 39. The record carrier body is provided with a layer 50, for example a photo-resist layer, which is sensitive to the radiation which is used. In the radiation path from the source 31 to the record carrier body 30 there is furthermore interposed an electro-optical modulator 34. This modulator is connected to the electronic control device 35. The information, for example a television program, which is applied to the terminals 36 and 37 in the form of an electrical signal is converted into radiation pulses of the laser source. At specific instants, determined by the information at the terminals 36 and 37, radiation spots are projected on the record carrier body.

The record carrier body has a circular circumference and is rotated with the aid of a motor 41, which is radially movable with the aid of a carriage 42, so that for example a spiral track can be written on the record carrier body.

The objective lens 39 is arranged so as to be movable in the axial, i.e. vertical, direction relative to the record carrier body and can be moved by actuation of a magnet coil 22. The magnitude of the electric currents through the magnet coil is determind by the control circuit 21. The input of this circuit is connected to the output of the circuit 20, in which the output signals of the radiation-sensitive detectors A and B are processed electronically. The detectors again form part of a focussing-error detection arrangement for determining the position of the record carrier surface, whose operation has been described in the foregoing.

The record carrier body 30 may be provided with a radiation-reflecting surface underneath the photo-resist layer. A separate auxiliary beam of radiation may be projected onto the record carrier body. After reflection at the record carrier body this auxiliary beam passes through a semitransparent mirror 40 and subsequently through a wedge 17. The wedge 17 forms two beams, which beams are incident on one of the detectors A and B.

Instead of a separate auxiliary radiation-source it is also possible, as is indicated in FIG. 9, to use the radiation of the write beam which has been reflected by the record carrier body for determining the position of the radiation-sensitive surface of the record carrier body relative to the plane of focussing of the objective system.

The invention may also be used in other imaging systems in which the focussing is to be maintained accurately, such as in microscopes.

What is claimed is:

1. An improved opto-electronic focussing error detection arrangement for detecting, in an optical imaging system, a deviation between a radiation reflecting surface and a focussing plane of an objective system, in particular for use in an apparatus for reading a record carrier with an optical radiation-reflecting information structure and an apparatus for optically writing information in a record carrier, which focussing error detection arrangement comprises a beam-splitting element disposed in the path of a radiation beam which is reflected by said surface and, disposed behind the beam-splitting element, a radiation-sensitive detection system which comprises two detectors each associated with one of the subbeams formed by the beam-splitting element, the outputs of the detectors being connected to the inputs of an electronic circuit in which a focussing-error signal is derived from the detector signals, wherein the detectors are disposed in a plane in which the reflected beam is focussed if the said deviation is zero, that each detector takes the form of a grating and comprises at least three radiation-sensitive strips, that said electronic circuit moreover derives a positional-error signal from the detector signals, and that each detector is connected to a separate selection device which effectively divides the detector into two detector sections, the bounding line of the detector sections being adjustable depending on the positional error signal which is applied to a control input of the selection circuit.

2. An arrangement as claimed in claim 1, the selection devices being constituted by electronic selection circuits, wherein each of the selection circuits is constituted by two rows of field-effect transistors with common insulated gate electrodes of a resistive material, each row the source region of each transistor being connected to a strip of the detector, and the drain regions of all transistors being interconnected, and the voltage gradients across the two common gate electrodes of a selection circuit having an opposite sense, the gate electrodes being connected to that output of the said electronic circuit at which the positional error signal appears.

* * * * *